United States Patent [19]

Takaba et al.

[11] Patent Number: 5,197,431
[45] Date of Patent: Mar. 30, 1993

[54] IGNITION TIMING CONTROL SYSTEM FOR ENGINE

[75] Inventors: Tetsuro Takaba; Tetsushi Hosokai, both of Kure; Toshihiro Ishihara, Saka; Hideki Kobayashi, Hiroshima, all of Japan

[73] Assignee: Mazda Motor Corporation, Hiroshima, Japan

[21] Appl. No.: 804,661

[22] Filed: Dec. 10, 1991

[30] Foreign Application Priority Data

Dec. 10, 1990 [JP] Japan .................................. 2-401181

[51] Int. Cl.$^5$ ................................................ F02P 5/14
[52] U.S. Cl. .................................... 123/423; 123/422; 123/416
[58] Field of Search ............... 123/423, 422, 418, 416, 123/492, 493

[56] References Cited

U.S. PATENT DOCUMENTS

| 4,730,587 | 3/1988 | Norota et al. | 123/416 |
| 4,732,125 | 3/1988 | Takizawa | 123/423 |
| 4,790,280 | 12/1988 | Umehara et al. | 123/422 |
| 4,915,076 | 4/1990 | Takizawa | 123/418 |
| 4,932,376 | 6/1990 | Linder et al. | 123/422 |
| 4,996,959 | 3/1991 | Akimoto | 123/422 |

FOREIGN PATENT DOCUMENTS 61-6262 2/1986 Japan .

*Primary Examiner*—Raymond A. Nelli
*Attorney, Agent, or Firm*—Keck, Mahin & Cate

[57] ABSTRACT

An ignition timing control system for an engine equipped with an automatic transmission corrects an ignition timing advance so as to retard ignition upon a demand to drop engine output torque when resumption of fuel injection is required after it has been interrupted during deceleration or when a shift of the automatic transmission is required. The ignition timing advance is corrected by a decaying retardation value so as to gradually fall with the passage of time. The corrected ignition timing advance is kept above a specific lower ignition timing advance limit, which is set smaller for lower air charging levels than for higher air charging levels. The corrected ignition timing advance is also kept below a specific lower limit ignition timing advance, which is set larger for lower air charging levels than for higher air charging levels.

7 Claims, 3 Drawing Sheets

IGNITION TIMING CONTROL SYSTEM FOR ENGINE

BACKGROUND OF THE INVENTION

1. Field of the Invention

The present invention relates to an engine control system and, more particularly, to an ignition timing control system for an automotive internal combustion engine which suppresses shocks caused by the engine due to rapid changes in engine output torque.

2. Description of Related Art

Engines installed in automotive vehicles are conventionally designed to retard ignition timing in order to drop engine output torque when the engine operates so that its output torque changes rapidly. This is done because when the engine operates under such conditions, it can suffer what are known as "torque shocks." Such an ignition timing control system is known from, for instance, Japanese Patent Publication No. 61-6,262, entitled "Engine Control System," published on Feb. 25, 1986.

In the ignition timing control system described in the publication mentioned above, after interrupting fuel injection, effected for fuel economy and to reduce harmful emissions during deceleration, when the engine resumes fuel injection in order to change its operating condition, fuel ignition is made at a time which is delayed relative to a time corresponding to an ordinary ignition timing advance set according to engine operating conditions. After resuming fuel injection, the retarded ignition timing is gradually varied so that it approaches the timing corresponding to an ordinary ignition timing advance. Controlling the ignition timing in such a way suppresses a rapid increase in engine output torque when fuel injection is resumed, after it has been interrupted, so that the engine causes less of a torque shock.

The ignition timing retarding control is performed both when resuming fuel injection after it has been interrupted and when the engine output torque changes rapidly, such as when an automatic transmission shifts and causes a torque shock. In such an ignition timing retarding control, the fuel is ignited at a timing corresponding to an eventual ignition timing advance, which is determined based on a basic ignition timing advance, a correction advance of ignition timing, which is predetermined according to engine operating conditions, and a corrective retardation of ignition timing, which drops engine output torque.

In an engine having an ignition system which has, e.g., a rotary distributor, the eventual ignition advance is limited to within upper and lower limits. Such limitations are provided to ensure that a high spark plug voltage is available to provide sparks in a correct firing order. The eventual ignition timing advance range is predetermined so as to be narrow at lower intake air charging levels. Such corresponds to a higher intake air charging level range, which requires strict conditions to ensure a high voltage is applied from the distributor at the spark plugs to fire them properly. Consequently, even when performing the ignition timing retarding control to prevent the engine from possibly causing torque shocks due to a rapid increase in output torque, the eventual ignition timing advance must be kept above the lower limit so that a small difference is present between the eventual ignition timing advance and an ordinary ignition timing advance; such is equivalent to the basic ignition timing advance as corrected by the corrective advance of ignition timing. That is, the eventual ignition timing advance is corrected to delay the ignition timing in the retarding ignition timing control in order to suppress torque shocks with certainty. Even though this is true, the eventual ignition timing advance, which is determined based on (1) the basic ignition timing advance, (2) a corrective ignition timing advance and (3) a corrective retardation of ignition timing, is restricted by the lower limit and is actually corrected by an ignition timing retardation smaller than the corrective retardation of ignition timing. Consequently, when, for instance, the engine operates at lower intake air charging levels, the retarding control of ignition timing, in which the eventual ignition timing advance is set smaller than the ordinary ignition timing advance, develops an insufficient drop in engine output torque. Hence, torque shock is not effectively suppressed.

SUMMARY OF THE INVENTION

It is, therefore, a primary object of the present invention to provide an ignition timing control system for an automobile engine which develops a sufficient drop in engine output torque so as to greatly reduce torque shocks caused in the engine due to a rapid change in engine torque, even when the engine operates at lower intake air charging levels.

It is another object of the present invention to provide an ignition timing control system for an automobile engine which develops a sufficient drop in engine output torque when the engine operates at lower intake air charging levels. Such permits the engine ignition timing to be controlled without adversely effecting the firing of spark plugs in proper order while the engine operates at higher intake air charging levels.

These objects are accomplished by providing an ignition timing control system for an automobile internal combustion engine equipped with an automatic transmission having a particular fuel interruption feature during deceleration. The ignition timing control system corrects an ignition timing advance so as to retard ignition when there is a demand to drop output torque from the engine so that either resumption of fuel injection is required after interruption of fuel injection performed during deceleration or the automatic transmission is required to be shifted. The advance of ignition timing is corrected by a predetermined decaying value of retardation so as to gradually fall with the passage of time. The corrected ignition timing advance is limited so that it stays above a specific lower ignition timing advance limit, which is made smaller when the engine operates at lower intake air charging levels than when the engine operates at higher intake air charging levels. The corrected ignition timing advance is also limited so that it stays below a specific lower limit ignition timing advance, which is made larger when the engine operates at lower intake air charging levels than when the engine operates at higher intake air charging levels.

According to the ignition timing control system of the present invention, because the range of the advance in ignition timing is wider for lower intake air charging levels than for higher intake air charging levels (i.e., narrower for higher intake air charging levels than for lower intake air charging levels), a drop in engine output torque is assured when the engine operates at lower intake air charging levels, and the system fires spark plugs properly when the engine operates at higher intake air charging levels.

BRIEF DESCRIPTION OF THE DRAWINGS

The above and other objects and features of the present invention will be apparent to those skilled in the art from the following description of a preferred embodiment thereof when considered in conjunction with the accompanying drawings, in which.

DETAILED DESCRIPTION OF THE PREFERRED EMBODIMENT

Figures 1, 2:
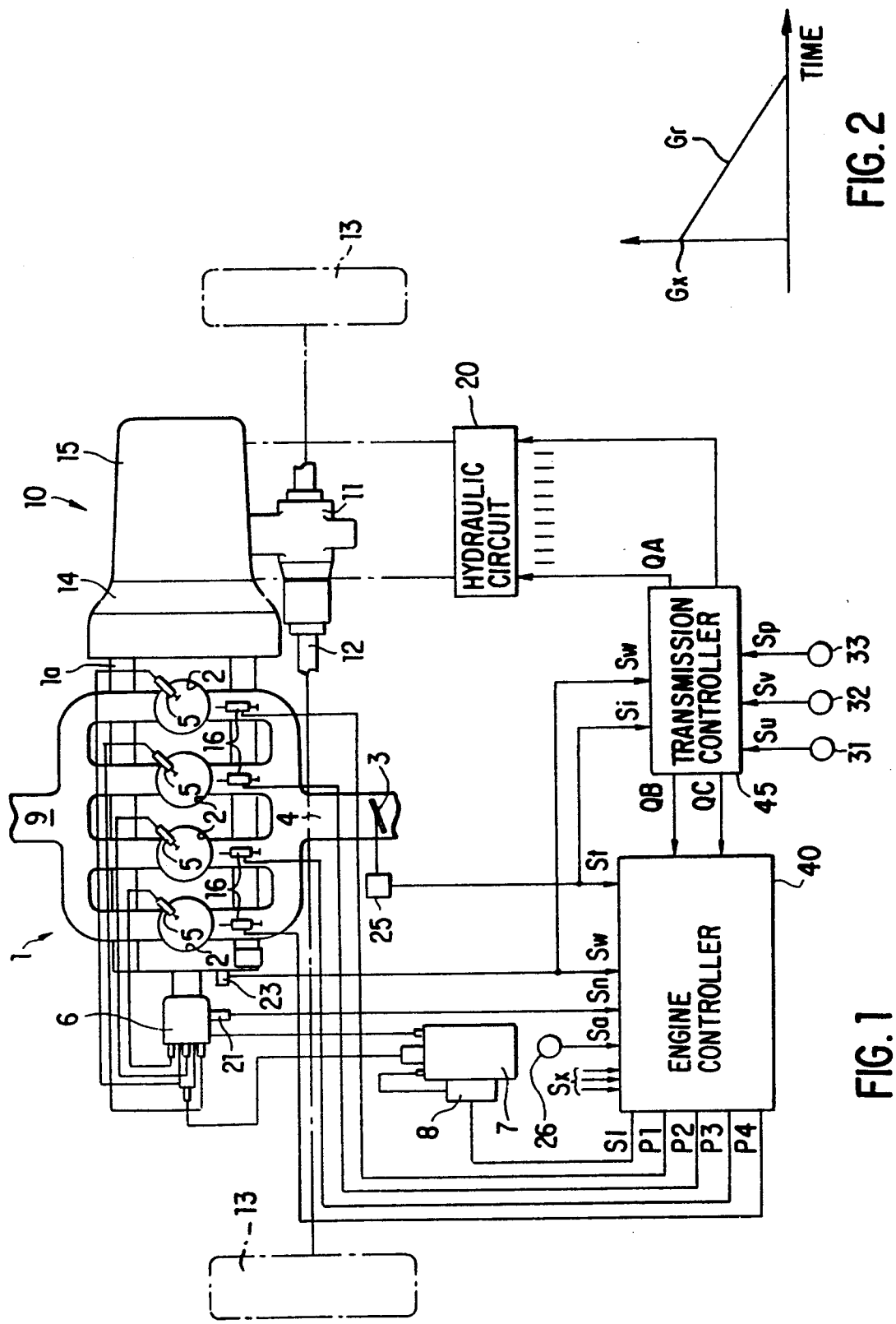
FIG. 1 is a schematic illustration of an internal combustion engine with an ignition timing control system in accordance with a preferred embodiment of the present invention.
FIG. 2 is a time chart showing a retardation of ignition timing.

Referring to the drawings in detail and, in particular to FIG. 1, an internal combustion engine 1, with a fuel interruption feature, is equipped with an automatic transmission 10. The engine 1, which is installed in a "front engine-front drive" type of automotive vehicle, is controlled by an ignition timing control system in accordance with a preferred embodiment of the present invention. The engine 1 is provided with four cylinders 2, arranged in a straight line, in which pistons (not shown) can slide. Each cylinder 2 is connected with a branch intake pipe branching off from the downstream end of a common intake pipe 4. A fuel injector 16, provided in each of the respective branch intake pipes, injects a quantitatively controlled rate of fuel under pressure, which is delivered from a fuel delivery system (well known in the art and not shown), to provide an air-fuel mixture and force it into a combustion chamber formed in an upper portion of the cylinder 2.

The air-fuel mixture is ignited and burned in the combustion chambers of the cylinders 2 by "firing" the spark plugs in proper order and at a proper timing by an ignition system. The ignition system comprises spark plugs 5, which are provided in respective cylinders 2; a distributor 6; an ignition coil 7; and an ignition timing controller 8. Gases produced during combustion processes are exhausted through an exhaust pipe 9. As a result of combustion of the air-fuel mixture, each piston is forced to reciprocate up and down in the cylinders, as is known. The reciprocating up and down movement of the pistons is changed by a crankshaft (not shown) of the engine 1 into rotary motion. The rotary motion is transmitted, as an engine output, to front wheels 13 through a power train including an automatic transmission 10, a differential gear unit 11 and an axle 12.

Automatic transmission 10, comprising a torque converter 14 and a hydraulically controlled transmission 15, is controlled by a hydraulic circuit 20. The torque converter 14, which may be of any well known type, comprises a pump fastened to the engine crankshaft, a turbine connected to the transmission 15 through a turbine shaft, and a stator inserted between the pump and turbine, which works to intercept oil thrown off by the turbine and redirect the path of the oil so it will enter the pump smoothly. The transmission 15, which may be of any well known type, has a plurality of hydraulically operated friction coupling elements, such as clutches and brakes which are selectively locked and released by the hydraulic circuit 20 to shift the transmission into desired positions or ranges, such as a park range (P), a reverse range (R), a neutral range (N), a drive range (D), a second range (S) and a first or low range (L), and desired gears in the forward ranges, such as first to fourth gears.

A transmission controller 45, which has a general purpose microcomputer and controls operation of the automatic transmission 10, receives various signals Sw, St, Su, Sv and Sp which are, respectively, representative of the temperature of engine coolant in the engine 1, the angle of opening of a throttle valve 3, the speed of rotation of the turbine of the torque converter 14 (referred to as a turbine speed), the speed of a vehicle in which the engine 1 is installed, and the position or range which has been selected by the automatic transmission. These signals Sw, St, Su, Sv and Sp are provided by sensors, namely, a temperature sensor 23 installed in the engine 1, a throttle opening sensor 25 provided in connection with the throttle valve 3, a turbine speed sensor 31 provided in connection with the turbine of the torque converter 14, a vehicle speed sensor 32 installed in the vehicle, and a shift position sensor 33 provided in connection with a shift lever (not shown) of the automatic transmission 10, all of which are well known in the art and are readily available. Based on these signals Sw, St, Su, Sv and Sp, the transmission controller 45 provides the hydraulic circuit 20 with a group of control signals QA so as to shift the automatic transmission 10 up or down for a given vehicle demand.

As is well known in the automatic transmission art, the transmission controller 45 has a data map of predetermined shift patterns stored in an internal memory thereof. A decision to shift the automatic transmission 10 up and down is made according to the shift patterns based on a throttle opening and a vehicle speed represented by the signals St and Sv, respectively. If the throttle opening and vehicle speed demands shifting the automatic transmission, the transmission controller 45 provides an engine controller 40 with signals QB and QC. The signal QB, which is referred to as a shift demand signal, is a binary signal having a high level when there is no execution of an up or down shift of the automatic transmission 10 and a low level when there is an actual up or down shift of the automatic transmission 10. If necessary, the shift demand signal QB may turn to a low level when a period of time has elapsed. The period of time is predetermined by considering a time delay between an actual supply of pressurized oil to the hydraulically operated friction coupling elements of the automatic transmission 10 and the moment the automatic transmission 10 has become ready for shifting. The shift demand signal, for example, may take a low level when there is no other demand for shifting the automatic transmission in the predetermined period of time. The signal QC, which may be referred to as a "shift information" signal, contains information pertaining to the shifting operation of the automatic transmission 10.

Engine controller 40, which has a general purpose microcomputer and controls operation of the engine 1, receives signals Sn and Sa, representative of the speed of rotation of the engine 1 and the quantitative rate of intake air introduced into the intake pipe 4, respectively, in addition to receiving the signals Sw, St, QB and QC. These signals Sn and Sa are provided by sensors, namely, a speed sensor 21 provided in association with the distributor 6 and an air flow sensor 26 disposed in the intake pipe 4, respectively, all of which are well known in the art and currently available. The engine controller 40 further receives a group of signals Sx representative of various operating conditions of the engine 1, including the temperature of intake air, which may be detected in any well known manner. All of these signals are used to determine the fuel injection condition of the fuel injectors 16 and to adjust the ignition timing at which the air-fuel mixture is ignited in the cylinders 2.

In fuel injection control, the engine controller 40 first calculates a basic quantitative rate of fuel to be injected into a respective cylinder 2, based on the incoming signals Sa and Sn, representing, respectively, the quantitative intake rate of intake air and the speed of the engine. Then, the controller calculates a quantitative fuel correction rate according to the incoming signals Sw and Sx, representing, respectively, the temperature of engine coolant and the operating condition of the engine, for each basic quantitative rate of fuel injection. A corrected quantitative rate of fuel injection is determined as the product of the basic quantitative rate of fuel injection and the quantitative fuel injection corrective rate. Finally, an eventual quantitative rate of fuel to be delivered from the injector 5 is determined, in the form of a pulse width, by adding a theoretical quantitative waste rate of fuel, i.e., a rate at which fuel is expected to be ineffectively wasted, to the corrected quantitative rate of fuel injection. In this way, the engine controller 40 provides the fuel injectors 16, associated with the respective cylinders 2, with control pulses P having pulse widths P1, P2, P3 and P4, timed with the operation of the engine 1. The fuel injectors 16 are kept open, depending upon the pulse widths P1-P4, respectively, so as to deliver a correct air-fuel ratio for any given engine demand.

When it is detected that the engine 1 operates in a predetermined operating condition for deceleration, in which, for instance, the throttle valve 3 is in its fully closed or idle position, the engine 1 operates at a speed of rotation which is higher than a predetermined specific speed of rotation, and the range of the automatic transmission 10 is any range other than the neutral range (N), the engine controller 40 removes the control pulses P1-P4 so as to interrupt fuel injection provided by the fuel injectors 16. Such is referred to as decelerating fuel interruption. When the engine 1 has a demand for acceleration as a result of, for instance, opening the throttle valve 3, the engine controller 40 again provides the respective fuel injectors 16 with the control pulses P1-P4, so that the operation of the fuel injectors 16 is resumed to deliver the fuel.

Engine controller 40 performs an ignition timing control in two ways, namely, a normal ignition timing control, when no resumption of fuel injection takes place and the shift signal QB is at a high level indicating that the automatic transmission 10 has no demand for shifting up or down, and a torque-drop ignition timing control, when the resumption of fuel injection takes place or the shift signal QB is at a low level indicating that the automatic transmission 10 has a demand for shifting up or down.

In normal ignition timing control, the engine controller 40 first calculates a basic ignition timing advance Go based on the incoming signals Sa and Sn representing, respectively, the quantitative intake air supply rate for a respective cylinder 2 and the engine speed. Then, the controller 40 calculates a corrective ignition timing advance Ga (which may be a positive value or a negative value), based on the incoming signals Sw and Sx, representing, respectively, the temperature of engine coolant and the operating condition of the engine, for each basic ignition advance Go. The sum of the basic ignition timing advance and the corrective ignition timing advance (Go+Ga) is used as an eventual ignition timing advance Gn. The engine controller 40 stores, in its internal memory, upper and lower ignition timing advances Ghh and Gwh for higher intake air charging level engine operating conditions. The upper and lower ignition timing advance limits Ghh and Gwh are predetermined so that as long as an eventual ignition timing advance Gn is between the upper and lower limits when the engine operates at higher intake air charging levels, the distributor 6 provides a high firing voltage, applied to the plugs 5 of the cylinders 2 in proper order and at a proper timing. The engine controller 40 also stores, in its internal memory, upper and lower advance ignition timing limits Ghw and Gww for lower intake air charging level engine operating conditions (referred to as lower air charging levels). The upper and lower ignition timing advance limits Ghw and Gww have been predetermined so as to include the upper and lower ignition timing advance limits Ghh and Gwh (Ghw>Ghh; Gww<Gwh). As long as an eventual advance of ignition timing Gn is between the upper and lower ignition timing advance limits Ghw and Gww and the engine operates at lower intake air charging levels (referred to as lower air charging levels), the distributor provides a high firing voltage which is made available to the plug 5 of each cylinder 2 with certainty, in proper order, and at proper timings. The air charging level (Ce) may, for instance, be a quotient obtained by dividing the quantitative rate at which intake air is introduced into the intake pipe 4 by the speed of rotation of the engine 1. When the engine 1 operates at higher air charging levels, the eventual ignition timing advance Gn, if it is out of the range between the upper limit Ghh and the lower limit Gwh, is changed to either the upper ignition timing advance limit Ghh or the lower ignition timing advance limit Gwh. On the other hand, when the engine 1 operates at lower air charging levels, the eventual ignition timing advance Gn, if it is out of the range between the upper limit Ghw and the lower limit Gww, is changed to either the upper ignition timing advance limit Ghw or the lower ignition timing advance limit Gww. In any event, the engine controller 40 provides the ignition timing controller 8 with an ignition control signal SI, corresponding to the eventual advance of ignition timing Gn, so that the ignition coil 7 instantly breaks or interrupts a current flow through the primary circuit coil windings at a proper timing, corresponding to the ignition control signal SI. A high pulse voltage is produced by the secondary circuit winding of the ignition coil 7, and the current flows from the secondary circuit winding to the spark plugs 5, through the distributor 6, in proper order. Consequently, each spark plug 5 produces a hot spark that ignites the air-fuel mixture.

In the torque-drop ignition timing control, the ignition timing is retarded in order to reduce or suppress what is known as "torque shock" generated when the engine drops its output torque when fuel injection resumes or when a shift of the automatic transmission 10 takes place. Upon resumption of fuel injection or an automatic transmission shift demand, the engine controller 40 calculates the basic ignition timing advance Go and the corrective ignition timing advance Ga in the same manner as described in the normal ignition timing control. An eventual ignition advance Gd in the torque-drop ignition timing control is determined as follows:

$$Gd = Go + Ga - Gr$$

In the above equation, Gr is a corrective ignition timing retardation (positive value) for retarding (or delaying) fuel ignition. The corrective ignition timing retardation varies or decays linearly with the passage of time.

As shown in FIG. 2, the corrective ignition timing Gr varies linearly from an initial retardation Gx to zero (0) with the passage of time. As was described previously, the engine controller 40 stores, in its internal memory, the upper and lower timing advance limits Ghh and Gwh for higher air charging levels and the upper and lower timing advance limits Ghw (>Ghh) and Gww (<Gwh) for lower air charging levels. When the engine 1 operates at very high or very low air charging levels, i.e., if the eventual ignition timing advance Gd is out of the range between the upper limit Ghh and the lower limit Gwh, the eventual ignition timing advance is changed to the upper ignition timing advance limit Ghh or Ghw, or to the lower ignition timing advance limit Gwh or Gww. In the same manner as in the normal ignition timing control, the engine controller 40 provides the ignition timing controller 8 with an ignition timing signal SI, corresponding to the eventual ignition advance Gd, so that the ignition coil 7 instantly breaks or interrupts the current flow through the primary circuit coil windings at a proper timing which corresponds to the ignition timing signal SI. The high pulse voltage is produced by the secondary circuit winding of the ignition coil 7, and the current flows from the secondary circuit winding to the spark plugs 5 through the distributor 6 in proper order, so the spark plugs 5 produce hot sparks that ignite the air-fuel mixture.

In a torque-drop ignition timing control, because the eventual ignition timing advance Gd is reduced by the corrective ignition timing retardation Gr, which decays linearly with the passage of time, the spark plug 16 is delayed from being fired more in the torque-drop ignition timing control than in the normal ignition timing control until the corrective ignition timing retardation Gr has decayed to 0 (zero). Consequently, for this time period, the output torque of the engine 1 drops. In addition, because the lower limit ignition timing advance Gww for higher air charging levels is lower than the lower limit ignition timing advance Gwh for higher air charging levels, the eventual ignition timing advance Gd can be smaller when the engine 1 operates at lower air charging levels than when the engine 1 operates at higher air charging levels.

As is apparent from the above, the torque-drop ignition timing control, if it takes place while the engine 1 operates at higher air charging levels, establishes the eventual ignition timing advance Gd so that it is within a relatively narrow range defined by the upper and lower ignition timing advance limits Ghh and Gwh. The spark plug 5 of each cylinder 2, therefore, is still properly fired. However, if the torque-drop ignition timing control takes place while the engine 1 operates at lower air charging levels, the timing control keeps the eventual ignition timing advance Gd sufficiently small, within a relatively wide range defined by the upper and lower limit advances of ignition timing Ghw and Gww, so that the spark plug 5 of each cylinder 2 is fired at a retarded timing. This results in a drop in engine output torque and, accordingly, in a decrease in torque shock.

Figure 3:
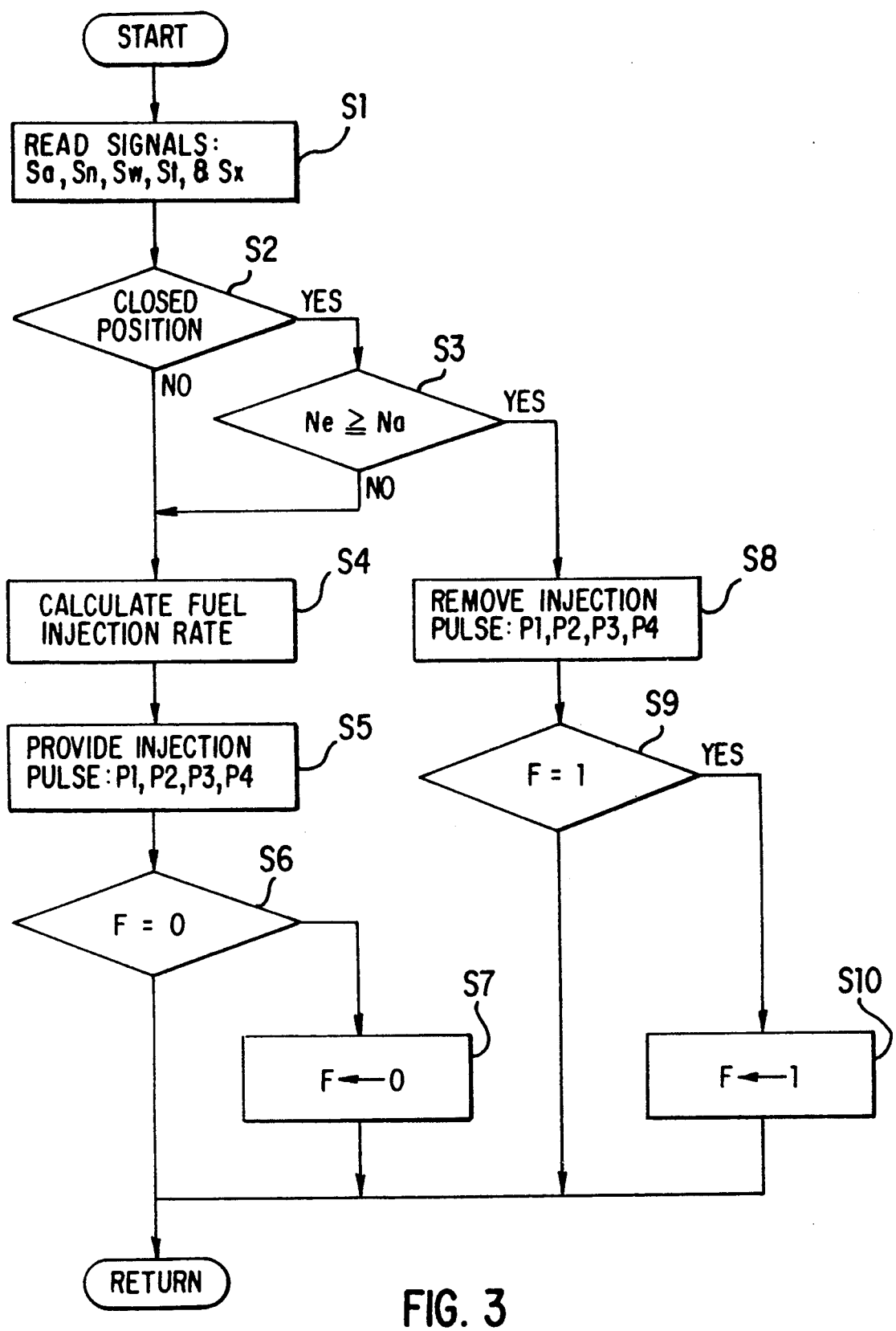
FIG. 3 is a flow chart illustrating a fuel injection control sequence for a microcomputer.
Figure 4:
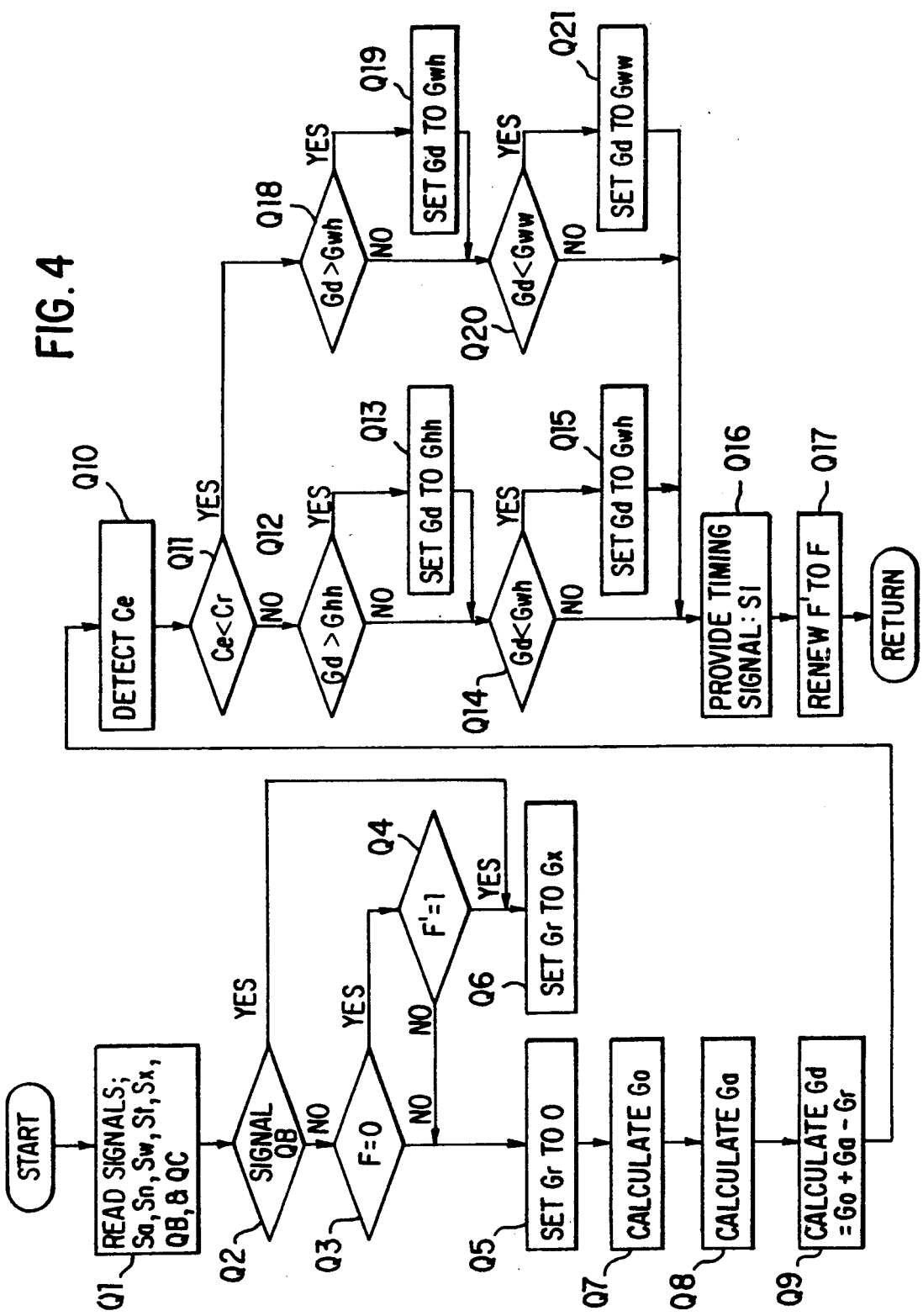
FIG. 4 is a flow chart illustrating a torque-drop ignition timing control sequence for the microcomputer.

The operation of the engine shown in FIGS. 1 is best understood by reviewing FIGS. 3 and 4, which are flow charts illustrating ignition timing control routines or sequences for the microcomputer of the engine controller 40. Programming a computer is a skill well understood in the art. The following description is written to enable a programmer having ordinary skill in the art to prepare an appropriate program for the microcomputer of the engine controller 40. The particular details of any such program would, of course, depend upon the architecture of the particular computer selected.

Referring now to FIG. 3, which is a flow chart of a fuel injection control sequence, the first step S1 is to read various signals, including signals Sa, Sn, Sw, St and Sx, to make decisions in steps S2 and S3. In steps S2 and S3, decisions are made, based on the signals St and Sn representing an opening or position of the throttle valve 3 and a speed Ne of the engine 1. These decisions are whether the throttle 3 is almost in its idle position (step S2) and whether the engine 1 operates at a speed Ne lower than a predetermined speed Na (step S3). If the answer to either of these decisions is no, then, in step S4, an eventual quantitative rate of fuel to be delivered from each fuel injector 5 is determined, in the form of a pulse width, by adding the quantitative waste rate of fuel to the product of the basic quantitative rate and the corrective rate. Then, in step S5, the engine controller 40 provides the fuel injectors 16 with control pulses P, having pulse widths P1, P2, P3 and P4 determined in step S4, which are timed with the operation of the engine 1.

After providing the control pulses P in step S5, a decision is made in step S6 as to whether a fuel interruption flag F has been set to a "0" state in the immediately preceding sequence, which indicates that no fuel interruption is required. Immediately after the decision, if the answer is yes, or after setting the fuel interruption flag F to the "0" state in step S7, if the answer is no, another fuel injection control sequence is performed.

If the answer to the decision in step S3 of the sequence is yes, this indicates that the engine speed Ne is equal to or higher than the predetermined speed Na. Then, the engine controller 40 removes, in step S8, the control pulses P having the pulse widths P1, P2, P3 and P4 provided in step S5 in the previous fuel injection control sequence. After removal of the control pulses P in step S8, a decision is made in step S9 as to whether the fuel interruption flag F has been set to a "1" state, which indicates fuel injection interruption has been required. Immediately after this decision, if the answer is yes, or after setting the fuel interruption flag F to the "1" state in step S10, if the answer is no, another fuel injection control sequence is performed.

Referring now to FIG. 4, which is a flow chart of a torque-drop ignition timing control sequence, which is synchronized with the fuel injection control sequence, the first step Q1 is to read various signals Sa, Sn, Sw, St and Sx as well as flag F in the fuel injection control sequence to make various decisions in later steps. Then, a first decision is made in step Q2 as to whether there is a shift demand signal QB transmitted to the engine controller 40 from the transmission controller 45. If there is no shift demand signal QB, a decision is made in step Q3 as to whether the fuel interruption flag F, which has been set in the fuel injection control sequence performed in synchronism with the torque-drop ignition timing control, is in a "0" state. If the answer to this decision is yes, no interruption of fuel injection is needed. Then, a further decision is made in step Q4 as to whether a prior fuel interruption flag F' (i.e., the flag F as read in step Q3 of the preceding sequence) is in a "1" state. After these decisions, the corrective ignition timing retardation Gr is set to 0 (zero) in step Q5 if the answer to either of the decisions made in steps Q3 and Q4 is no, or to Gx in step Q6 if the answer to either of the decisions made in steps Q2 and Q4 is yes.

After setting the corrective ignition timing retardation Gr in step Q5 or Q6, calculations are made in step Q7 to obtain the basic ignition timing advance Go, based on the signals Sa and Sn. The signals Sa and Sn represent, respectively, the quantitative intake air rate and the engine speed of engine. The corrective ignition timing advance Ga, based on the signals Sw and Sx, representing, respectively, the temperature of engine coolant and the operating condition of engine, is calculated in step Q8. Then, in step Q9, the eventual ignition timing advance Gd is calculated according to the following formula:

$$Gd = Go + Ga - Gr$$

A calculation is made in step Q10 to obtain an air charging level (Ce) as the quotient obtained by dividing the quantitative rate at which intake air is introduced into the intake pipe 4 by the speed of rotation of the engine 1. These parameters are represented, respectively, by the signals Sa and Sn. The air charging level (Ce) is compared, in step Q11, with a predetermined specific air charging level Cr to determine whether the engine 1 is operating at higher air charging levels or at lower air charging levels. If the air charging level (Ce) is larger than the specific air charging level Cr, the engine 1 is considered to operate at a higher air charging level. Then, a decision is made in step Q12 as to whether the eventual ignition timing advance Gd is within the upper and lower ignition timing advance limits Ghh and Gwh, which are predetermined for higher air charging levels. That is, a decision is made in step Q12 as to whether the eventual ignition timing advance Gd is larger than the upper ignition timing advance Ghh. Immediately after the decision made in step Q12, if the eventual ignition timing advance Gd is equal to or smaller than the upper ignition timing advance limit Ghh, or after setting the eventual ignition timing advance Gd to the upper ignition timing advance limit Ghh in step Q13, if the eventual ignition timing advance Gd is larger than the upper ignition timing advance limit Ghh, a decision is made in step Q14 as to whether the eventual ignition timing advance Gd is smaller than the lower limit ignition timing advance Gwh. If the eventual ignition timing advance Gd is smaller than the lower ignition timing advance limit Gwh, the eventual ignition timing advance Gd is set to the lower ignition timing advance limit Gwh in step Q15.

In step Q16, engine controller 40 provides an ignition timing signal SI corresponding to the eventual ignition timing advance Gd, which is within the upper and lower ignition timing advance limits Ghh and Gwh. In step Q17, the last fuel interruption flag F' is replaced by the fuel interruption flag F for the current ignition timing control sequence. The final step of the sequence represented in FIG. 4 orders return to perform another sequence.

If, as a result of the decision made in step Q11, the air charging level (Ce) is determined to be equal to or smaller than the specific air charging level Cr, the engine 1 is considered to operate at a lower air charging level. Decisions are then made as to whether the eventual advance of ignition timing Gd is within the upper and lower ignition timing advance limits Ghw and Gww, predetermined for lower air charging levels. That is, in step Q18, a decision is made as to whether the eventual advance of ignition timing Gd is larger than the upper ignition timing advance limit Gwh. Immediately after the decision made in step Q18, if the eventual ignition timing advance Gd is equal to or smaller than the upper ignition timing advance limit Gwh, or after setting the eventual ignition timing advance limit Gd to the upper ignition timing advance limit Gwh in step Q19, if the eventual advance of ignition timing Gd is larger than the upper of ignition timing advance limit Gwh, a decision is made in step Q20 as to whether the eventual ignition timing advance Gd is smaller than the lower ignition timing advance Gww. The eventual ignition timing advance limit Gd, if it is smaller than the lower ignition timing advance limit Gww, is set to the lower ignition timing advance limit Gww in step Q21.

In the same manner as for higher air charging levels, the engine controller 40 provides a ignition timing signal SI corresponding to the eventual ignition timing advance Gd, which is within the upper and lower ignition timing advance limits Ghh and Gwh. After replacing the last fuel interruption flag F' with the fuel interruption flag F for the next torque-drop ignition timing control sequence, the final step of the sequence shown in FIG. 4 orders return to perform another sequence.

It is to be understood that although the present invention has been described with respect to a preferred embodiment thereof, various other embodiments and variants may occur to those skilled in the art. Any such embodiments and variants which fall within the scope and spirit of the invention are intended to be covered by the following claims.

What is claimed is;

1. An ignition timing control system for an internal combustion engine, comprising;
    operating condition detecting means for detecting at least an intake air charging level;
    torque drop demand detecting means for detecting a demand for dropping output torque from said engine;
    ignition timing control means for correcting an ignition timing advance so as to retard ignition when said torque drop demand detecting means detects the demand for dropping output torque and limiting the ignition timing advance, after it is corrected, so that it stays above a specific lower ignition timing advance limit, and providing an ignition timing signal corresponding to the larger of an eventual ignition timing advance and the lower ignition timing advance limit when the intake air charging level is lower than a specific intake air charging level; and
    ignition means for producing ignition based on said ignition timing signal.

2. An ignition timing control system as recited in claim 1, wherein an ignition timing signal corresponding to the larger of the eventual ignition timing advance and a different lower ignition timing advance limit is provided by the ignition timing control means when the intake air charging level is not lower than said specific intake air charging level.

3. An ignition timing control system as recited in claim 2, wherein said ignition timing control means corrects said ignition timing advance so that it gradually falls with the passage of time.

4. An ignition timing control system as recited in claim 2, wherein said intake air charging level is defined by a quotient obtained by dividing a rate at which intake air is introduced into said engine by engine rotation speed.

5. An ignition timing control system for an internal combustion engine equipped with an automatic transmission, comprising;
  operating condition detecting means for detecting at least an intake air charging level;
  torque drop demand detecting means for detecting a demand for dropping output torque from said engine;
  fuel injection control means for interrupting injection of fuel during deceleration;
  ignition timing control means for correcting an ignition timing advance so as to retard ignition when said torque drop demand detecting means detects the demand for dropping output torque and limiting the ignition timing advance, after it is corrected, so that it stays above a specific lower ignition timing advance limit, and providing an ignition timing signal corresponding to the larger of an eventual ignition timing advance and the lower ignition timing advance limit when the intake air charging level is lower than a specific intake air charging level; and
  ignition means for producing ignition based on said ignition timing signal.

6. An ignition timing control system as recited in claim 5, wherein said torque drop demand detecting means detects a demand for resumption of fuel injection into said engine after interruption of fuel injection during deceleration.

7. An ignition timing control system as recited in claim 5, wherein said torque drop demand detecting means detects a demand for shifting the automatic transmission.

* * * * *